No. 692,180. Patented Jan. 28, 1902.
J. H. CLARK & A. MAYER.
AUTOMATIC BOX MAKING MACHINE.
(Application filed May 2, 1900.)
(No Model.) 8 Sheets—Sheet 1.

Fig. 1.

No. 692,180. Patented Jan. 28, 1902.
J. H. CLARK & A. MAYER.
AUTOMATIC BOX MAKING MACHINE.
(Application filed May 2, 1900.)
(No Model.)
8 Sheets—Sheet 3.

Witnesses
H. B. Hallock.
L. H. Morrison

Inventors
James H. Clark
Alfred Mayer
By their Atty.

No. 692,180.  
J. H. CLARK & A. MAYER.  
AUTOMATIC BOX MAKING MACHINE.  
(Application filed May 2, 1900.)

(No Model.)

Patented Jan. 28, 1902.

Witnesses:  
H. B. Hallock  
L. H. Morrison

Inventors  
James H. Clark  
Alfred Mayer  
By Atty.

Fig. 6.

No. 692,180. Patented Jan. 28, 1902.
J. H. CLARK & A. MAYER.
AUTOMATIC BOX MAKING MACHINE.
(Application filed May 2, 1900.)

(No Model.) 8 Sheets—Sheet 6.

Witnesses:
H. B. Hallock
L. H. Morrison

Inventors:
James H. Clark
Alfred Mayer
By [signature] Atty.

THE NORRIS PETERS CO., PHOTO-LITHO., WASHINGTON, D. C.

UNITED STATES PATENT OFFICE.

JAMES H. CLARK AND ALFRED MAYER, OF PHILADELPHIA, PENNSYLVANIA.

AUTOMATIC BOX-MAKING MACHINE.

SPECIFICATION forming part of Letters Patent No. 692,180, dated January 28, 1902.

Application filed May 2, 1900. Serial No. 15,285. (No model.)

*To all whom it may concern:*

Be it known that we, JAMES H. CLARK and ALFRED MAYER, citizens of the United States, residing at Philadelphia, county of Philadelphia, and State of Pennsylvania, have invented a certain new and useful Improvement in Automatic Box-Making Machines, of which the following is a specification.

Our invention relates to a new and useful improvement in automatic box-making machines, and has for its object to construct a machine to utilize nails in continuous strings, as shown in United States Letters Patent No. 341,413, issued May 4, 1886, which will perform all of the operations of assembling, nailing, and delivering a box automatically.

A further object of our invention is to effectually feed sectional shooks to the anvils so as to make boxes whose sides, bottoms, or ends have two or more sections; and a further object of our invention is to form a box step by step prior to its being finished by nailing and to accomplish this nailing in a succeeding step, so that while there is sufficient time given for the performing of each operation, yet a completed box is ejected from the machine for every step, thus giving the machine a large capacity while running at slow speed.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

In carrying out our invention as here embodied we provide a suitable base 1, in which is secured a hollow post 2, and around the upper portion of this post is journaled the sleeve 3, which carries the turn-table 4, the latter in turn supporting the anvils 5, said anvils being secured to the outer ends of the mandrels 6. These mandrels are journaled in the bearings 7, secured upon the turn-table, and have secured upon their inner ends the four toothed pinions 8, by which the mandrels, and consequently the anvils, are rotated upon their axes as well as locked in the desired positions during the operations of the machine, as will be hereinafter set forth.

Figure 2:
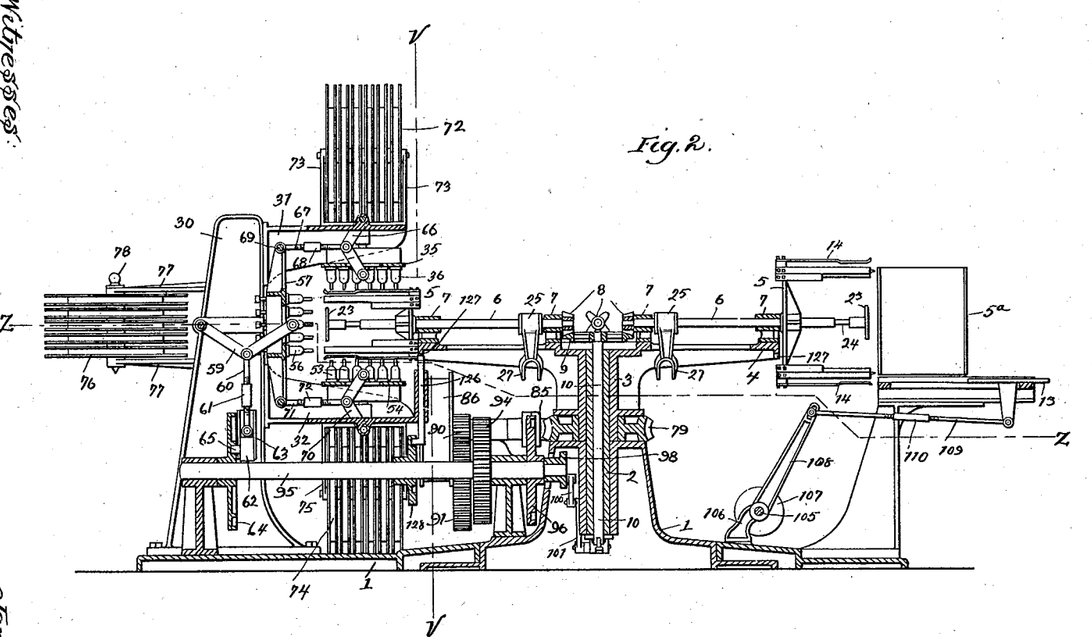
Fig. 2, a section at the line *x x* of Fig. 1.
Figure 10:
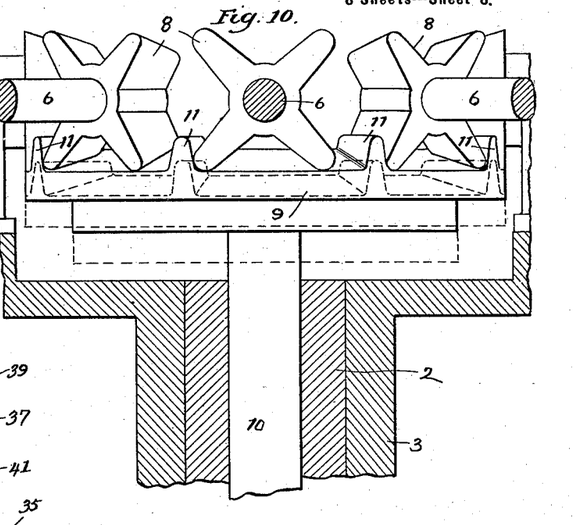
Fig. 10 is an enlarged section of the locking mechanism for revolving the anvils upon their axes and locking them during the operation of feeding the shooks thereto, driving the nails, and ejecting the completed box.
Figure 11:
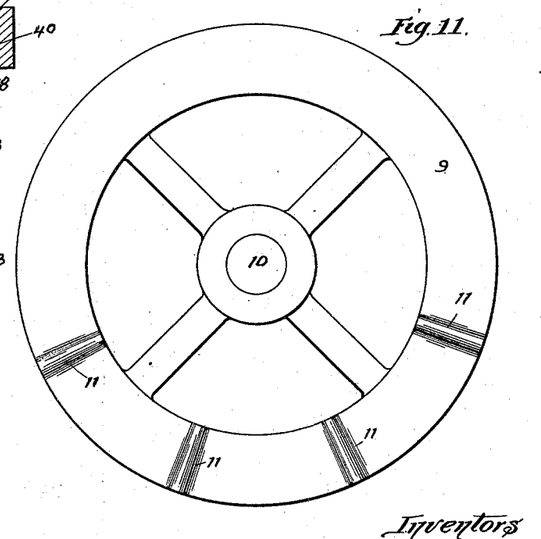
Fig. 11, an enlarged plan view of a mutilated crown-wheel.

A crown-wheel 9 is mounted upon the spindle 10, which latter passes through the hollow post 2, and it may be splined therein so as to have a limited vertical movement, but held against rotation. This crown-gear is mutilated—that is to say, has but a part thereof provided with the teeth 11, which are shown in Fig. 11 to be four in number, and these teeth when the turn-table is revolved will mesh with the teeth of the pinions 8 and cause them to revolve intermittently at the proper time to revolve the anvils upon their axes, so as to put them in the positions for the reception of the shooks from the magazines. This crown-wheel is also utilized for locking the anvils against rotation, which is effected by the bearing of the smooth surface thereof against two of the teeth of each of the pinions, as clearly shown in Figs. 2 and 10, and this double function of the crown-wheel necessitates that it be lowered when its teeth enter into mesh with the teeth of the pinions in order that the latter may turn, and after each partial rotation of the pinions they are again locked by the crown-wheel being again elevated, so as to bear against the two lower teeth in each pinion. This raising and lowering of the crown-wheel to revolve and lock the pinions is accomplished by suitable cam mechanism, which will be hereinafter explained.

While we do not intend limiting our invention to any number of anvils carried by the turn-table, we have here shown as a means of carrying out our invention eight anvils carried by said turn-table and five magazines for holding the shooks to be fed to the anvils, so as to complete the assembling of a box before reaching the driving mechanism, leaving one blank step after the completed box leaves the driving mechanism, in which no action takes place thereon, and a step at which the boxes are ejected from the anvil, the magazines for holding the shooks and the mechanisms for feeding said shooks to the anvils being of the following construction, and for convenience in describing the same the various steps are designated as $a$, $b$, $c$, $d$, $e$, $f$, $g$, and $h$.

Figure 1:
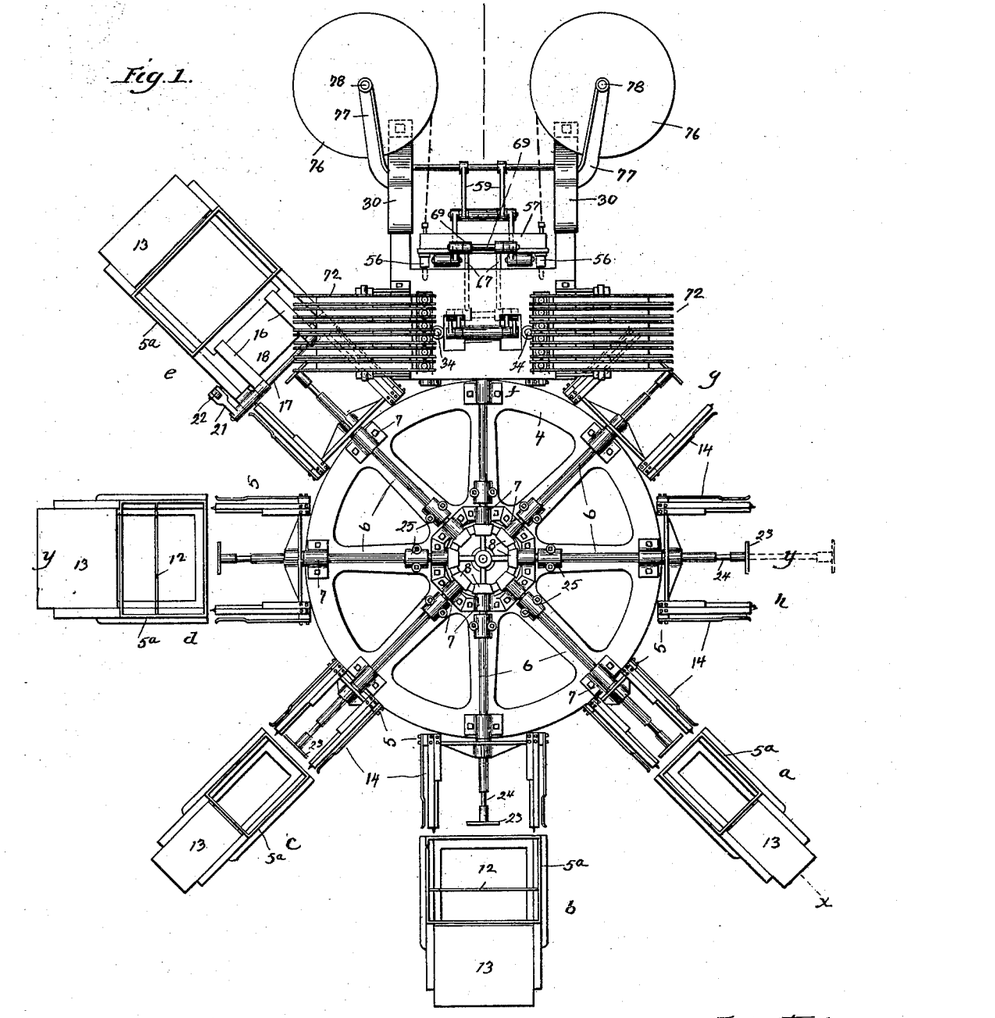
Figure 1 is a plan view of our improved machine.
Figure 3:
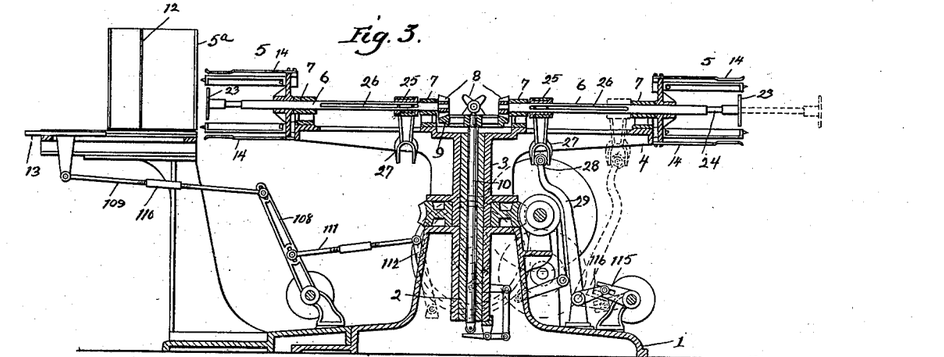
Fig. 3, a section on the line *y y* of Fig. 1.
Figure 4:
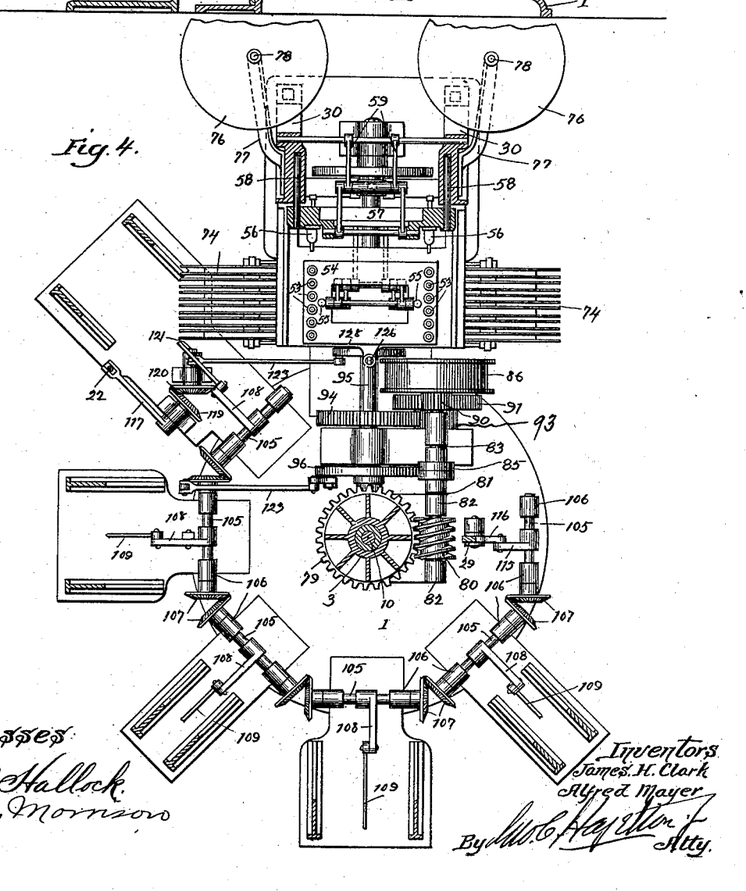
Fig. 4, a section on the line *z z* of Fig. 2.
Figure 5:
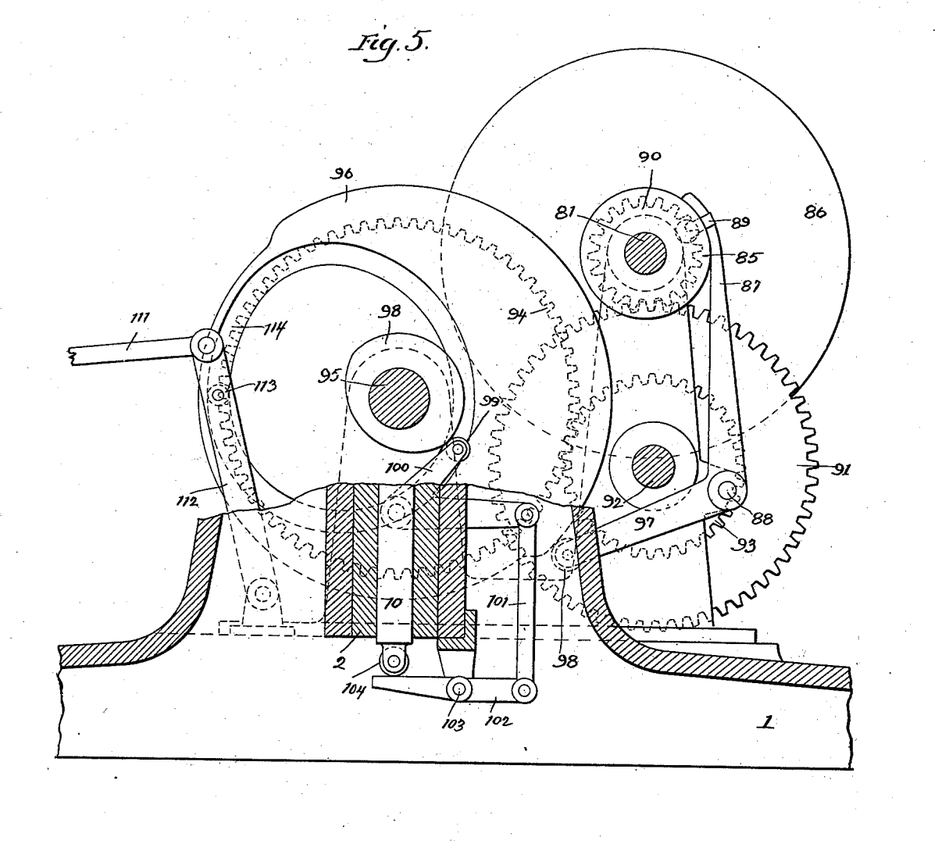
Fig. 5, an enlarged view of the operating-cams and gearing therefor.

A magazine $5^a$ is located upon the frame of the machine at $a$, $b$, $c$, $d$, and $e$, and each of these magazines is adapted to hold the particular shaped shooks which are to be fed to the anvils at that step—as, for instance, the magazine at $a$ holds the shooks for one end of the boxes, the magazine at $b$ the shooks for one of the sides of the boxes, the magazine at $c$ the shooks for the other end of the boxes, the magazine at $d$ the shooks for the other side of the boxes, and the magazine at $e$ the shooks for the bottom of the boxes. Any of these magazines may be subdivided for the holding of sectional shooks, and, as here shown, in Figs. 1 and 3 the magazines for holding the sides are thus divided by the partitions 12, and the two compartments formed by these partitions within the magazines are adapted to accommodate the two sections of the shooks. Each of the magazines has a push-out slide 13, fitted in guideways therebeneath, so that when these slides are drawn forward the lower shook in the magazine will be pushed out from beneath the stack of shooks onto the particular anvil which at that time is in alinement with this magazine.

Figure 7:
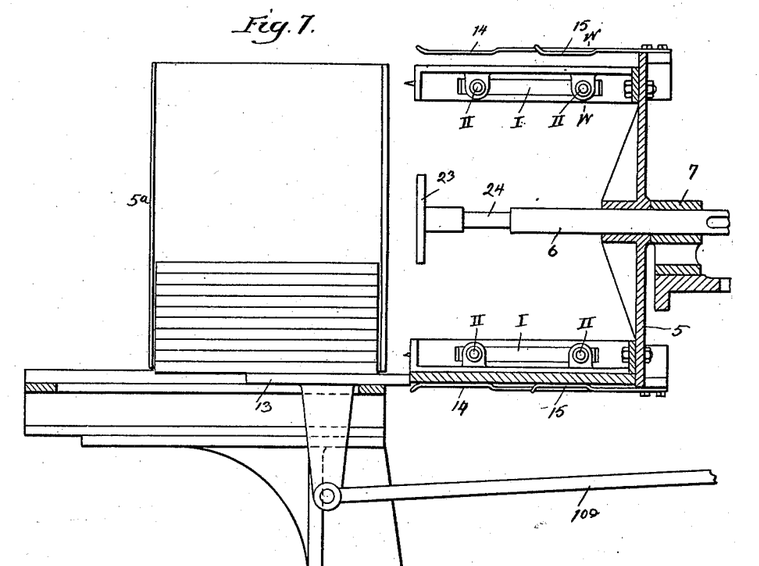
Fig. 7, an enlarged detail section of one of the anvils and magazines and the push-out for delivering the shooks from the bottom of the magazine to the anvil.
Figure 8:
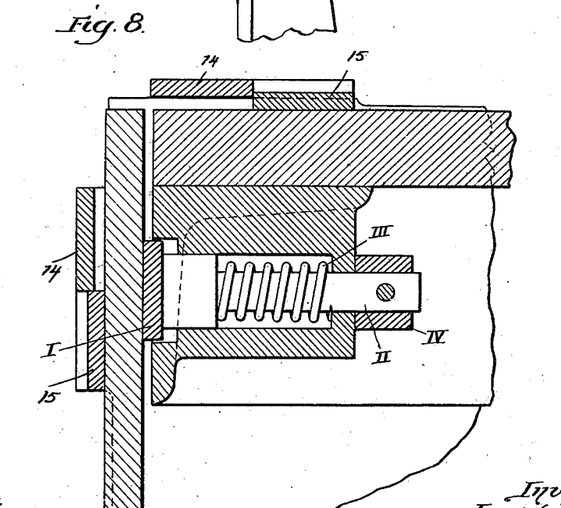
Fig. 8 is a further enlarged section on the line *w w* of Fig. 7.

Each of the anvils is the shape of a box to be formed and are preferably made up of a framework and provided with the series of clamp-springs 14 and 15, the former being of sufficient length to bear upon the outer portion of the shooks, while the latter are of less length and adapted to bear upon the inner portion of the shooks. These springs are upturned at their outer ends, so as to facilitate the reception of the shooks, as clearly shown in Fig. 7, and when the anvils register with the magazines and are stopped and locked by the mechanism to be hereinafter described the face of each anvil which is the lowermost stands in alinement with the bottom shook of the magazine. In this position the said face of the anvil is adapted to receive the shook when pushed out from the magazine, which is accomplished by the inward movement of the slide 13, and when the shook passes to the anvil it will be there held by the pressure exerted thereon by the springs 14 and 15. In order that the shooks which form the sides of the box and which are inserted after the shooks which form the end of the box may not drag upon these last-named shooks, we have provided means for holding these side shooks out of direct contact with the anvil, and consequently with the end shooks after the latter have been fed in position, and these means consist of the strips I, set in the faces of the anvil and having the shank-rods II attached thereto, around which are coiled the springs III in such manner as to force these strips outward, which movement is limited by the stop-collar IV. These strips, as is obvious, will form a bearing for the shooks to be slid upon, and yet when the assembled box has reached the driving mechanism and the nails are driven home, as will be hereinafter set forth, these shooks will be forced against the end shooks, since the strips will yield sufficiently for that purpose.

Figure 9:
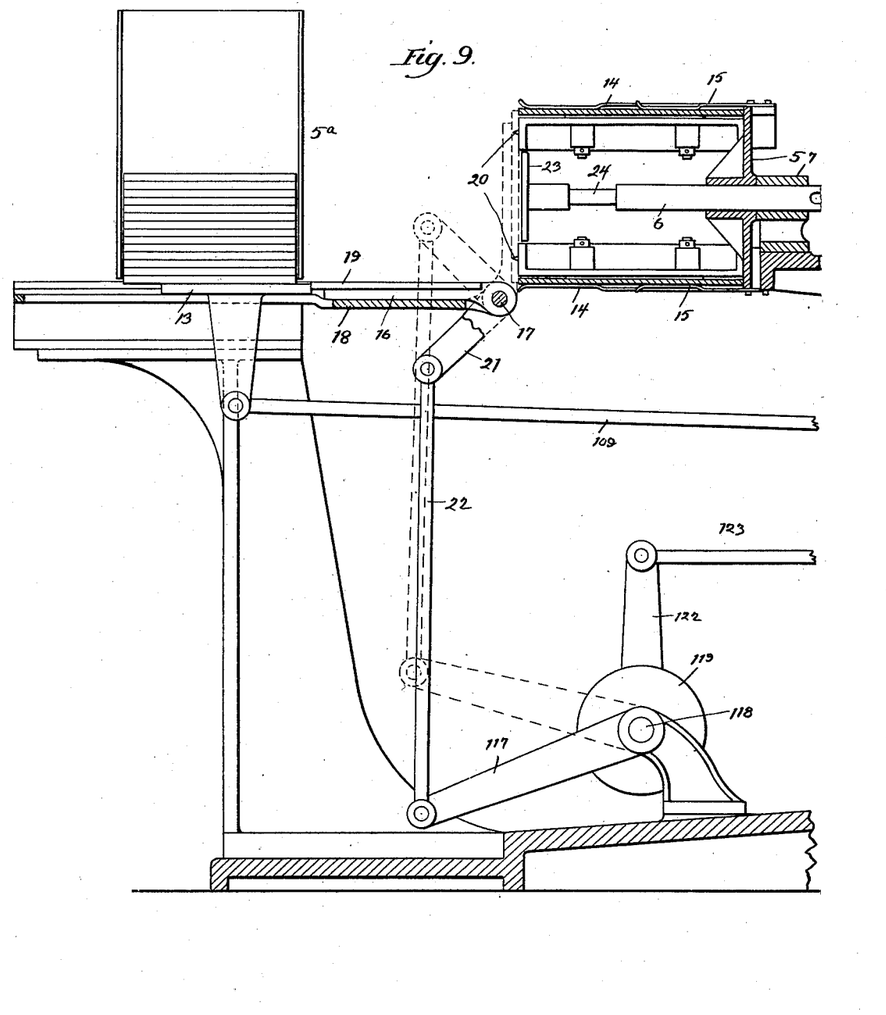
Fig. 9, an enlarged section of one of the anvils and the magazine for supplying the shooks for the bottom of the box, illustrating the mechanism for forcing these shooks against the anvil prior to the nailing operation.

From the foregoing description following the course of one of the anvils it is obvious that when the machine is put in operation the anvil standing at step $a$ will first have one of the end shooks placed upon its under face, after which the turn-table will revolve another step, carrying this anvil to step $b$, during which movement this anvil will be revolved upon its axis a quarter of a turn by the teeth of this pinion engaging with the teeth of the crown-wheel, as before described. This will bring the next face of the anvil to the under side and in alinement with the magazine located at step $b$. Now while the turn-table remains stationary and the push-out of this slide is operated by its suitable mechanism the shook for one of the sides will be forced between the springs 14 and 15 and this lower face of the anvil, when the turn-table is ready to move another step. Likewise this revolving of the turn-table through another step will revolve this anvil a quarter of a turn, bringing the next face thereof to the under side and in alinement with the magazine at $c$. Here again the turn-table dwells, the anvil is locked, the push-out slide inserts the shook for the other end of the box between the springs and the anvil, and the machine is again ready to move the turn-table another step. This same operation takes place in carrying this anvil to step $d$, so that a shook is placed upon the then under side of the anvil for the other side of the box, and likewise when the turn-table again moves and carries this anvil to step $e$ it will be in a position to receive the shook for the bottom of the box in the following manner: This magazine for holding the shooks for the bottom of the box is located at a greater distance from the travel of the anvils, as shown in Fig. 9, and the swinging arms 16, which are pivoted at 17 to the extension 18, normally lie horizontally and in position to receive the shook 19 when fed from the magazine by the push-out slide. Now by the swinging upward of these arms to a vertical position, as shown in dotted lines in Fig. 9, the shook will be carried against the end of the anvil which extends to the bottom of the box, and in order that it may be retained thereagainst after the arms have been swung down to their normal position prongs 20 project from the anvil, which are embedded in the shook when swung upward, and these prongs will take a sufficient hold upon the shook to permit its being conveyed by the anvil to the driving mechanism. The swinging movement of the arms 16 is effected by the lever 21, which is connected by the rod 22 to suitable mechanism therefor, which will be hereinafter described. The next movement of the turn-table will carry this anvil to step $f$, where the driving mechanism is located, and at the dwell of the turn-table which follows the box thus assembled will be completed by all of the nails for its securement being driven therein in one operation. The next movement of the turn-table will carry this anvil, with the completed box, to the step $g$, which is an idle step, as no operation takes place upon the box at this point; but the next movement of the turn-table will carry the anvil, with the completed box, to step $h$, at which point the box will be ejected from the anvil by the plunger 23, secured on the end of the plunger-rod 24, which slides in the mandrel 6 and is connected with the sleeve 25 by a pin passed through the slot 26 in said mandrel, and this sleeve has dependent therefrom the yoke 27, which when each of the anvils arrives at step $h$ passes over and embraces the roll 28, carried upon the upper end of the lever 29, the latter being operated by suitable mechanism, hereinafter described. When the anvil has reached this step $h$ and the completed box be ejected, the machine has completed one cycle, and this anvil is ready to repeat the operations just described in assembling and forming a new box, and it will be understood that each successive anvil has gone through the same operations, so that the next movement of the turn-table to start this anvil upon a new cycle will bring the following anvil to step $h$ for the ejection of a completed box, which has likewise gone through the various steps of assembling and formation, and so thereafter for every step of the turn-table a box will be completed and ejected.

Figure 12:
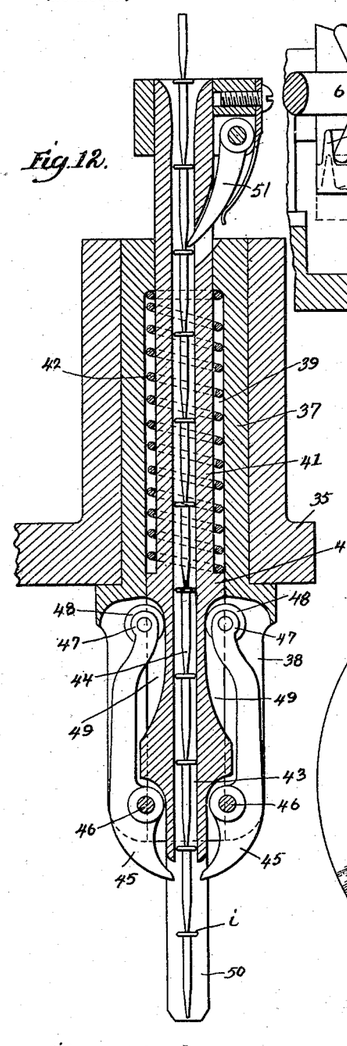
Fig. 12, an enlarged central section of one of the drivers, showing a string of nails passing therethrough.

The mechanism for driving the nails when each anvil reaches step $f$ is as follows: 30 represents standards projecting up from the base of the machine and having the brackets 31 and 32 secured thereto, and bearings 33 are formed upon the upper bracket, in which are fitted the rods 34, so as to slide therein, having secured to their lower ends carrier 35, thus permitting this carrier to have a limited vertical movement. Within this carrier are secured the drivers 36 by the body thereof being set within sockets formed therein, and each of these drivers consists of the body 37, which is preferably tubular in shape, being slotted at the lower end, as indicated at 38. Within this body is formed the central bore 39, in which the nail-guide 40 is fitted to slide, and this nail-guide has a shank 41, which extends upward through the central bore, having the spring 42 coiled therearound, which serves to normally hold the nail-guide downward to its lower limit. Through the nail-guide and shank thereof is a guideway 43, through which the string of nails 44 pass, as clearly shown in Fig. 12. A pair of jaws 45 are pivoted to 46 to the slotted portion of the body 37 of the driver, and their heel ends 47 carry rolls 48, journaled therein, which bear against the nail-guide, the latter being notched at each side, as indicated at 49, so as to form cam-surfaces for actuating these heel ends, and thus bring about proper operation of the jaws 45, as will be hereinafter set forth. The lower end of the nail-guide is extended, as indicated at 50, so as to provide for the jaws projecting therein to engage the string of nails, and a suitable spring-actuated pawl 51 is carried by the upper end of the shank of the plunger for engaging the head of the nails to bring about the feeding of the string.

Figure 6:
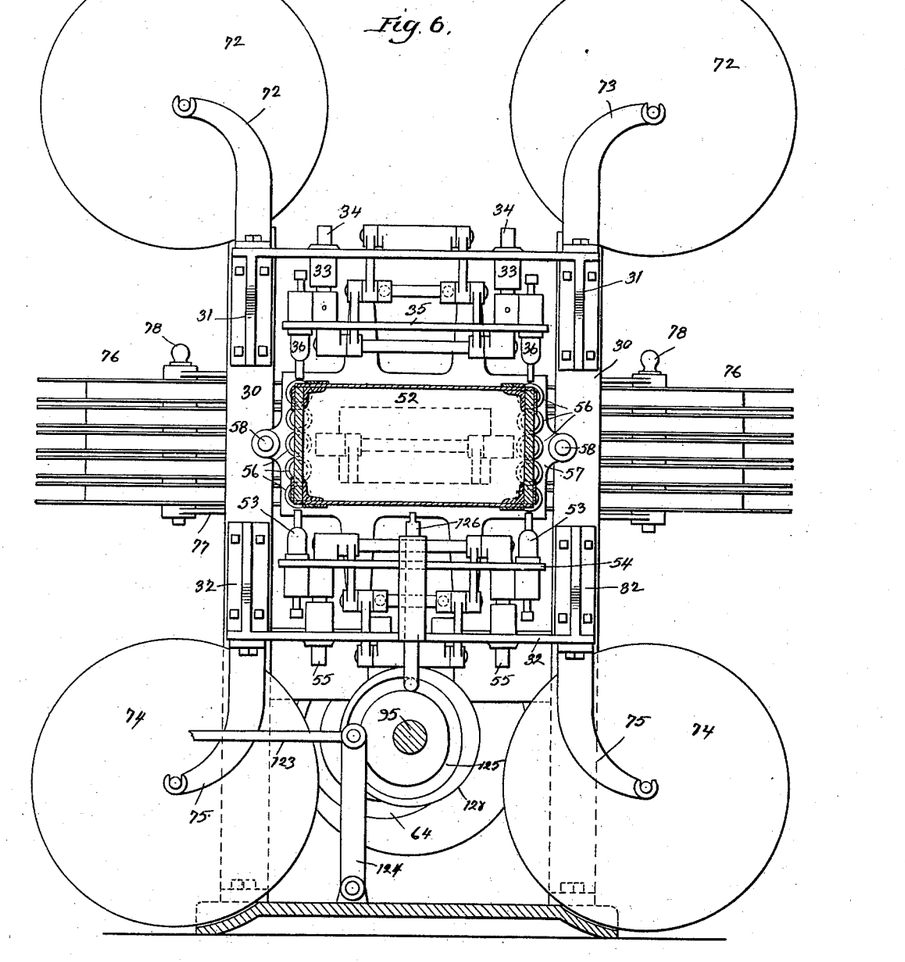
Fig. 6, a section on the line *v v* of Fig. 2.

In practice when the box is in place, as indicated at 52 in Fig. 6, the downward movement of the carrier will first bring the nose or extension 50 of each of the nail-guides against the box, and thereafter the noses of these nail-guides will remain stationary, and any further downward movement of the carrier will cause the body of each driver to ride downward upon the plungers against the action of the springs 42, which will also carry the jaws downward, during which movement the rolls 48 will ride upon the cams 49 in such manner as to cause these jaws to close sufficiently to engage the head of the lowest nail, (designated by $i$,) after which the continued downward movement of these jaws will drive this nail into the box, and when the head thereof has been driven home the shape of the cams 49 is such as to cause the jaws to sever the point of the succeeding nail from the head of the driven nail. The return upward movement of the carrier will permit the members of each driver to be restored to their normal position by the action of the springs 42, as will be readily understood, and when these carriers have reached their upward limit the driving operation will have been completed, and it is to be noted that all of the drivers attached to this carrier will perform their operation at the same time by the same movement, and therefore drive the entire series of nails for the particular side of the box being acted upon. The position of the box when reaching the driving mechanism is such that its ends are in a vertical position, while its sides are horizontal, and therefore the latter are exposed to the action of the upper and lower drivers, and as the lower drivers, which will be next explained, are arranged opposite to the upper drivers, which have just been explained, and move toward the box in unison therewith both the sides will be nailed in place at the same time. These lower drivers, which are designated 53, are set in the carrier 54, which also has a limited vertical movement by being supported upon the rods 55, which slide in the bracket 32, so that when this lower carrier is pushed upward its drivers will act upon the under side of the box to drive the entire series of nails necessary to secure the ends of the box. Mechanism for shoving this carrier will be presently explained.

To complete the box, it is necessary that the bottom should have been nailed thereon, and this is accomplished at the same time that the sides are nailed by the drivers 56, which are set in the carrier 57, which is supported by the rods 58, the latter sliding in the standard 30, and these three carriers are moved to and from the box in unison to accomplish the results just described by the following mechanism: The carrier 57 has connected thereto the toggle-levers 59 in such manner that when the knee of said levers is pushed upward the carrier will be forced inward, as will be readily understood, and the forcing upward of these levers is accomplished by the rod 60, having the turnbuckle 61 for its adjustment, and the lower end of this rod is connected to the cross-head 62, which is fitted to slide in the guideways 63 and is actuated by the cam 64 by the shoe 65 of the cross-head projecting into the groove of said cam, which groove is of the proper shape to give the predetermined time to the movements of the toggle-joint; but as the peculiar shape of this cam-groove forms no part of our invention we have not deemed it necessary to illustrate the same in detail. The upper carrier 35 also has connected therewith the toggle-levers 66, which serve to force it downward when the knees of said levers are forced inward, which is accomplished by the connecting-rod 67, which latter is provided with the turnbuckle 68 for its adjustment. The outer end of this rod 67 is pivoted at 69 to the carrier 57, and thereby connects the toggle-levers 66 with said carrier, so that the inward movement of the carrier 57 operates the carrier 35, and likewise the lower carrier 54 is operated by the carrier 57 by its toggle-levers 70 being connected with said carrier 57 by the rod 71, which is likewise provided with a turnbuckle 72 for its adjustment. Thus it will be seen that when the carrier 57 is moved in either direction the carriers 35 and 54 will also be moved in a corresponding direction—that is to say, either toward or from the box—thereby driving all of the nails necessary to complete the box in one operation, so that when these drivers have been returned to their normal position the box is free to move from out of the range of the driving mechanism by the revolving of the turn-table, as before set forth. The strings of nails are fed to the upper drivers 36 from the reel 72, upon which the strings of nails have been previously coiled, and these reels are loosely journaled in the brackets 73, so that they may be removed when the nails thereon have been exhausted and others substituted therefor, so as to avoid the stopping of the machine for any length of time to replenish the reels. Likewise the strings of nails are fed to the lower drivers 53 from the reels 74, and these last-named reels are also loosely journaled in the brackets 75 for the same purpose. The reels 76 are journaled in the brackets 77 by means of the pins 78 passed through the hubs thereof, and these last-named reels serve to supply the drivers 56 with the strings of nails, each string being led through the shank 41 of this respective nailer and thereafter being fed nail by nail, as before described in connection with Fig. 12.

While no particular stress is laid upon the particular mechanism here utilized for carrying out the before-described operations, yet such mechanism is here shown as will properly perform these functions and for a better understanding of the completed machine will now be described. The sleeve 3, which supports the turn-table and through which the turn-table gets its rotary motion, has secured to the lower end thereof the worm-wheel 79, with which meshes the worm 80, the latter being secured upon the shaft 81, which is journaled in suitable bearings 82. A corresponding short shaft 83 is journaled in the bearings 84, so as to be in alinement with the shaft 81, and these two shafts are adapted to be connected and disconnected by the clutch 85, one member of which is secured upon each of the abutting ends of these shafts. A pulley 86 is secured upon the shaft 83 and is adapted to receive a belt which may be connected with any suitable source of power, so as to cause the shaft 83 to constantly revolve while the machine is in operation. When the clutch is thrown into and out of action, the shaft 81 will be caused to revolve with the shaft 83 or dwell, as the case may be, thereby giving to the turn-table, through the worm-wheels, its step-by-step intermittent rotation. This clutch is controlled to connect and disconnect the shaft 81 to and from the shaft 83 by the latch 87, which is pivoted at 88, the nose thereof being adapted to act upon the lug 89 of the clutch-bolt, which not only withdraws said bolt, but arrests the movement of the shaft 81 at a given point, as is well understood in power-presses and such machinery. This latch-bolt is controlled by a suitable cam which will be presently explained. The shaft 83 carries the pinion 90, which meshes with the gear-wheel 91, the latter being secured upon the shaft 92, and this shaft is journaled in suitable bearings and also has secured thereon the small gear-wheel 93, which meshes with the gear-wheel 94.

This last-named gear-wheel is secured upon the cam-shaft 95, which is journaled lengthwise of the machine and in the center thereof, carrying the various cams for controlling and operating the various mechanisms automatically, and it will be noted that this arrangement will give to the cam-shaft a constant rotation so long as the power-shaft 83 is in the mesh, which will not be affected by the stopping and starting of the turn-table through the intermittent operation of the shaft 81. Among the cams secured upon this shaft 95 is the cam 96, which is for controlling the latch 87 for operating the clutch to start and stop the turn-table, as before described, and for this purpose this latch is provided with the lever 97, carrying a roll 98, which bears upon the periphery of said cam, said periphery being of such contour as to bring about the movements of the latch in proper time relative to the other mechanisms. As here shown, the contour of this cam will hold the worm-shaft inactive, and consequently cause the turn-table to dwell, while the cam-shaft 95 makes a quarter-revolution and will permit the turn-table to revolve while said cam-shaft completes the remaining three-quarters of its revolution. As before set forth, when the turn-table is to be revolved it is necessary that the crown-wheel shall be limited, and this is brought about by the cam 98, against which the roll 99 bears, said roll being journaled in the short member of the angle-lever, the long member of said lever being connected by the link 101 to the horizontal lever 102, pivoted at 103, upon the inner end of which rests the roll 104, journaled in the lower end of the spindle 10, by which arrangement said spindle will be supported. When the turn-table is revolved, the cam 98 will permit the inner end of the lever 102 to drop to lower the crown-wheel sufficiently to permit the pinions 8 to be revolved upon their axes by the teeth of said crown-wheel, as and for the purpose already set forth. When the turn-table dwells, the cam 98 will so actuate the intervening levers as to force the crown-wheel upward against the teeth of the pinions 8, thus locking them against any further rotation so long as the mechanism is in this position, which will lock the anvils at their various steps, and while thus locked the shooks will be fed to said anvils, as hereinbefore described.

A series of short shafts 105 are journaled in suitable bearings 106, arranged around the base of the machine, and these shafts are geared together by the beveled gears 107, which mesh together, being carried by each of the shafts, there being six of the latter, all of which are thereby caused to move in unison. Five of these shafts have secured thereon the arms 108, each of which is connected by the rod 109 to one of the push-out slides 13, so that when these short shafts are oscillated the push-out slides will be operated to feed the shooks, as before set forth, and for convenience an adjustment is provided in each of the rods 109 in the form of a turnbuckle 110. In order that the short shafts may be given an oscillatory movement, one of the arms 108 has connected therewith the rod 111, the inner end thereof being pivoted to the cam-lever 112, and this lever is provided with the roll 113, which travels in the cam-groove 114, the contour of which latter is such as to give the cam-lever the proper movement to effect the feeding of the shooks in the proper time, as before set forth. One of the short shafts 105 has secured thereon the slotted arm 115, with which is connected the heel end 116 of the lever 29, so that when these short shafts are oscillated to accomplish the feeding of the shooks, as just set forth, the ejector 23 of that particular anvil which at that particular time registers with step $h$ will be operated through the connection of the lever 29 with the yoke 27 to eject the completed box from this anvil, as before explained. The rod 22, which operates the lever 21 to swing the arms 19 upward in carrying the bottom shook against the anvil, has its lower end connected with the lever 117, and this lever is secured upon the short shaft 118, the opposite end of which is provided with the beveled gear 119. A corresponding bevel-gear 120 meshes with the first-named gear and is secured upon the short shaft 121, to which the arm 122 is secured. This arrangement will cause the oscillatory motion imparted to the arm 122 to be transmitted to the arm 117 for the purpose before set forth, and in order that the proper oscillation may be given to the arm 122 a rod 123 extends to the cam-lever 124, which latter carries a roll, and said roll projects into a groove in the cam 125. The contour of this cam-groove is such as to give the proper movements to the intervening mechanism just described to effect the delivery of the bottom shook in the proper time relative to the various other mechanisms of the machine. When each anvil reaches step $f$, where the driving mechanism is located, it is necessary that it be locked positively against any lost motion in either direction in order that the nails may be placed in the exact positions intended, and for this purpose the latch-bolt 126 is fitted to slide vertically and engage with the notches 127, formed in the turn-table central of the mandrel of each anvil, and when this bolt is shot into either of these notches it is obvious that the turn-table will be securely locked against any further rotation or any lost motion, thereby holding the particular anvil having the assembled box thereon in order that the nails may be properly driven. This locking of the turn-table also facilitates the registering of the other anvils with the various magazines and feed mechanisms and insures the accurate working of the machine. The latch-bolt 126 is actuated by the cam 128, which has a groove therein into which the lower end of the bolt projects and which is of such contour as to withdraw from or shoot the bolt into the notches at the proper time for accomplishing the desired result.

While the step G has been designated as a "blank" step, if found desirable suitable mechanism may be arranged in conjunction therewith for marking the boxes with the trade-mark or advertising matter of the concern for whose use they are intended.

As before stated, it is not intended to limit the invention to the particular details of mechanism for bringing about the necessary movements to accomplish the functions of the machine, since the gist of this invention rests in the broad idea of automatically feeding shooks to a series of anvils to assemble a box and then completing the box by driving all the nails at one step.

It is obvious that the various mechanisms of the machine may be made adjustable, so as to adapt it for the making of boxes of various sizes within certain limits without departing from the spirit of our invention.

Having thus fully described our invention, what we claim as new and useful is—

1. In a machine for automatically assembling and nailing a box, a series of anvils so mounted as to move step by step, mechanisms for feeding the various shooks to said anvils, mechanism for driving the entire series of nails in the box to secure its sections together, mechanism for ejecting each box from its anvil after being completed, and means for operating the various mechanisms.

2. A machine for automatically assembling and nailing a box, consisting of a series of anvils adapted to travel step by step, means for revolving said anvils upon their axes, a series of magazines for holding the various shooks to form the box, means for feeding the shooks from the magazines to the anvils, a nailing mechanism to which each assembled box is delivered, and means for operating said nailing mechanism, whereby all the nails are driven to complete the box at one step, substantially as specified.

3. In a machine of the character described, a suitable base, a turn-table mounted upon said base, means for revolving said turn-table intermittently, a series of anvils, mounted upon said turn-table, means for revolving said anvils upon their axes, a series of magazines for holding the shooks to form the box, means for feeding said shooks to the anvils, nailing mechanism to which the assembled boxes are successively delivered, means for driving all of the nails to complete the box at one step, and means for ejecting each box from its anvil after being completed, substantially as specified.

4. A machine of the character described, comprising a suitable base, a turn-table mounted upon said base, means for revolving said turn-table intermittently, a series of anvils carried by the turn-table, said anvils being so arranged as to be revolved upon their axes by the revolving of the turn-table, means for locking said anvils against axial rotation, a series of magazines for holding the various shooks for forming a box, feed mechanism connected with each magazine for delivering the shooks to the anvils, suitable mechanisms for nailing the assembled box, means for feeding the nails to said nailing mechanism, and mechanism carried by each anvil for ejecting the completed box from said anvils, and means for causing the various mechanisms to operate, as and for the purpose set forth.

5. In a machine of the character described, the combination of a suitable base, a hollow post secured in said base, a sleeve journaled upon the post, a worm-wheel secured upon the sleeve, a worm meshing with said worm-wheel, a short shaft upon which said worm is secured, said shaft being mounted in suitable bearings, a second short shaft journaled in alinement with the first named, a clutch adapted to connect said shafts, mechanism for throwing said clutch into and out of action, whereby the first-named short shaft may be revolved intermittently by the last-named short shaft, a turn-table, mounted upon the herein-named sleeve, a series of mandrels journaled upon said turn-table, a series of anvils carried upon the outer ends of said mandrels, pinions secured to the inner ends of said mandrels, a mutilated crown-wheel adapted to mesh with, revolve and lock said pinions when the turn-table is revolved, mechanism for raising and lowering said crown-wheel to bring about the last-named functions, magazines located within the travel of the anvils and adapted to hold the various shooks for forming the box, a push-out slide arranged beneath each of the magazines, mechanism for operating each slide to deliver a shook to the anvil, means carried by the anvil for holding the shooks in place while the assembled box is being conveyed from step to step, nail-driving mechanism, and means for operating the parts.

6. In a machine of the character described, the combination of a suitable base, a hollow post secured in said base, a sleeve journaled upon the post, a worm-wheel secured upon the sleeve, a worm meshing with said worm-wheel, a short shaft upon which said worm is secured, said shaft being mounted in suitable bearings, a second short shaft journaled in alinement with the first named, a clutch adapted to connect said shafts, mechanism for throwing said clutch into and out of action, whereby the first-named short shaft may be revolved intermittently by the last-named short shaft, a turn-table mounted upon the herein-named sleeve, a series of mandrels journaled upon said turn-table, a series of anvils carried upon the outer ends of said mandrels, pinions secured to the inner ends of said mandrels, a mutilated crown-wheel adapted to mesh with, revolve and lock said pinions when the turn-table is revolved, mechanism for raising and lowering said crown-wheel to bring about the last-named functions, magazines located within the travel of the anvils and adapted to hold the various shooks for forming the box, a push-out slide arranged beneath each of the magazines, a series of shafts journaled around the base of the machine and geared together, arms 108 secured to these last-named shafts, adjustable rods connecting the last-named arms and the push-out slides, means for giving the geared shafts an oscillatory movement, means for nailing the shook, and mechanism for ejecting the boxes from the mandrels.

7. The combination in a machine of the character described, of a turn-table, means for revolving said turn-table, a series of mandrels journaled upon the table, a pinion carried upon the inner end of each mandrel, means for revolving said pinions upon their axes and locking them against such rotation at predetermined times, a series of anvils carried upon the outer ends of the mandrels, means carried by each anvil for receiving and retaining the shooks to form the assembled box, a series of magazines for holding the various shooks to be fed to the anvils, push-out slides arranged beneath each of the magazines, means for operating these slides to feed the shooks to the anvils, swinging arms arranged in connection with one of the magazines for the reception of the shooks for forming the bottom of the box, means for operating said arms after a shook has been received thereby for transferring said shook to the anvil, and means for nailing the box together to complete the same, substantially as specified.

8. The combination in a machine of the character described, of a series of anvils, each of which consists of a frame, springs secured thereon for receiving and holding the shooks thereagainst, prongs projecting from that portion of the anvil which corresponds to the bottom of the box to be formed, whereby when the shook for forming said bottom is forced against the anvil it will be pierced and retained by these points in order that it may be conveyed to the driving mechanism, as specified.

9. An anvil for use in combination with a machine of the character described, consisting of a skeleton frame, clamp-springs 14 and 15 secured thereon in such manner as to receive the shooks and hold them against the faces of the anvil, strips I mounted within certain of the faces of the anvil, shanks 11 to which the strips are attached, and springs coiled around said shanks and normally holding the outer surfaces of the strips beyond the faces of the anvil, whereby certain of the shooks when fed to the anvil will be held out of contact with the edges of the shooks previously fed thereto, while permitting the first-named shooks to be forced inward against the edges of the other shooks when the box is being nailed, as specified.

10. An anvil for use in combination with a machine of the character described, consisting of a skeleton frame, clamp-springs 14 and 15 secured thereon in such manner as to receive the shooks and hold them against the faces of the anvil, strips I mounted within certain of the faces of the anvil, shanks 11 to which the strips are attached, springs coiled around said shanks and normally holding the outer surfaces of the strips beyond the faces of the anvil, whereby certain of the shooks when fed to the anvil will be held out of contact with the edges of the shooks previously fed thereto, while permitting the first-named shooks to be forced inward against the edges of the other shooks when the box is being nailed, and prongs carried by that portion of the anvil which corresponds to the bottom of the box for piercing and holding the bottom shook while the box is being assembled, as specified.

11. In an anvil for use in connection with a machine of the character described, a skeleton frame upon which the box may be assembled, a series of short springs arranged to bear upon the inner portion of the shook, a series of longer springs adapted to bear against the outer portion of the shooks, and prongs carried by that portion of the anvil which corresponds to the bottom of the box for piercing and holding the bottom shook while being conveyed to the driving mechanism, as specified.

12. The combination in a machine of the character described, of an anvil consisting of a skeleton frame, means for holding the assembled shooks upon said anvil, a hollow mandrel upon which said anvil is mounted, a plunger-rod fitted to slide within the hollow mandrel, an ejector carried upon the outer end of the plunger-rod, a sleeve fitted to slide upon the outside of the mandrel, a pin passed through said sleeve and through a slot in the mandrel, said pin connecting said sleeve and the plunger-rod, and means for sliding said sleeve longitudinally upon the mandrel whereby the ejector may be moved to and fro to eject a completed box from the anvil, as specified.

13. In combination, driving mechanism, carriers for the driving mechanism, frames in which the carriers are slidable, toggles connecting the frames and carriers, rods pivoted to a carrier and to toggles, an operating-rod pivoted to the toggles of one of the carriers as and for the purpose described.

14. In a box-making machine, the combination with the mandrels, pinions by which the mandrels are rotated, a crown-gear meshing with the pinions and connected to a suitable source of power, means whereby said crown-gear is elevated into engagement with teeth of the pinions to hold them against movement.

15. In a box-making machine, a turn-table, mandrels journaled thereon, anvils carried by the mandrels, means for feeding shooks to the mandrels, pinions on the mandrels, a mutilated crown-gear over which the pinions travel, means for lifting the crown-gear into contact with two teeth of each pinion to prevent rotation, and for rotating the turn-table on the descent of the crown-gear.

16. In combination with the reciprocating carriers of a driving mechanism of the character described, a series of drivers, each of which consists of a body, jaws pivoted in the outer end of said body, a nail-guide fitted to slide in the body, cams formed upon the nail-driver and arranged to act upon the heel ends of the jaws so as to open and close said jaws for grasping the lowest nail to feed it downward and sever it from the string of nails, a spring coiled about the shank of the nail-guide for operating the latter in one direction, a slotted extension formed with the nail-guide for arresting the movement of the latter while the body is permitted to continue its movement to accomplish the driving of the nail, and a spring-actuated pawl adapted to engage the heads of the nails and hold the string of nails against retraction when the body is moving upward on the nail-guide, as specified.

17. A nail-driver for use in combination with the nailing mechanism of a box-making machine consisting of a body, the lower portion of which is slotted, a nail-guide fitted to slide in the body and having a shank formed therewith, a spring coiled about said shank and incased within the body so as to force the nail-guide outward, jaws pivoted in the lower end of the slotted portion of the body so that their cutting edges can be swung in contact with each other, rolls journaled in the heel ends of said jaws, cams formed upon the nail-guide against which said rolls bear, said cams being adapted to first partly close the jaws so as to cause them to grasp the string of nails above the head of the lowest nail, and finally to sever this nail from the string of nails at the time said nail is driven home, a spring-actuated pawl carried by the nail-guide and adapted to engage the heads of the nails and hold the string of nails against retraction when the body is moving upward upon the nail-guide, as specified.

18. In a box-making machine, a turn-table, mandrels journaled thereon, anvils carried by the mandrels, means for feeding shooks to the anvils, a mutilated crown-gear, pinions on the mandrels rotated by the crown-gear, so positioned as to permit two teeth of each pinion to engage the mutilated portion of the crown-gear, a nailing mechanism, gearing for causing the nailing mechanism to operate while the mandrels are held stationary, as and for the purpose described.

19. In a box-making machine, a turn-table, mandrels, anvils on the mandrels, means for intermittently rotating the mandrels as the table is turned, and for delivering shooks to the anvils, a latch-bolt engaging the table at predetermined points for retaining it stationary, means for projecting and retracting the bolt, means for holding the mandrels stationary simultaneously with the table, a nailing mechanism operating in conjunction with the anvils successively and mechanism for ejecting the completed box from the anvils, substantially as described.

20. In a box-making machine, a turn-table having notches on its under side, a latch-bolt, means for projecting the latch-bolt into the notches, means for intermittently rotating the table and withdrawing the latch-bolt, mandrels journaled on the table, anvils carried by the mandrels, mechanism for delivering shooks to the mandrels, and box-ejecting mechanism geared to operate when the turn-table is locked.

21. In a box-making machine, a turn-table, mandrels mounted thereon, anvils on the mandrels, shook-receptacles, means for delivering shooks to the sides of the mandrels, a swinging arm stationed between one of the shook-receptacles and the mandrels, means for swinging the arm upward to carry shooks to the ends of the mandrels, as and for the purpose described.

22. In a box-making machine, the combination with the intermittently-rotatable table, of mandrels journaled thereon anvils carried by the mandrels, means for delivering shooks to the anvils, pinions on the mandrels, a plunger-rod slidable in each mandrel, a plunger thereon, a sleeve connected to the plunger-rod and having a depending yoke, a lever engaged by the yoke, a series of short rock-shafts connected by gear-wheels, and suitable connections whereby one of said shafts actuates the lever engaged by a yoke, substantially as described.

23. In a box-making machine, a turn-table, mandrels journaled thereon, anvils carried by the mandrels, shook-receptacles, means for delivering shooks from the receptacles to the anvils, means for intermittently turning the table, and rotating the mandrels, means for locking the table and mandrels against rotating, a nail-driving and a shook-actuating mechanism actuated while the table and mandrels are locked and suitable power-applying means, substantially as described.

24. In a box-making machine, nail-drivers acting in unison from several sides, and each comprising a body having a slotted lower portion, a nail-guide slidable in the body, means for forcing the nail-guide downwardly, jaws pivoted in the slots of the lower end of the body, said jaws having cutting edges for severing the nails and surfaces to engage the head of a nail for driving it, means on the nail-guides for actuating the jaws, means for holding the nails against retraction, anvils adapted to carry shooks for the boxes for nailing, means for moving the nail-drivers into contact with the shooks and suitable mechanism for delivering shooks to the anvils and for ejecting the box when nailed.

25. In a box-making machine, a nailing mechanism comprising a body having a slotted lower portion, a nail-guide slidable in the body and having a shank formed therewith, means for forcing the nail-guide outward, jaws pivoted to the body and having coacting cutting edges, means on the nail-guide for operating the jaws to drive a nail and sever said nail from a string of nails, means for preventing retraction of the nails, and in combination with the nailing mechanism, shook-carrying anvils mounted to rotate and adapted to pass successively within the field of operation of the drivers, and means for ejecting a completed box from the anvils.

26. In a box-making machine, the combination with a turn-table of mandrels and anvils carried thereby, shook-receptacles, shook-actuating slides for delivering shooks to the anvils, a swinging arm stationed between one of the shook-receptacles and the anvils, box-ejecting plungers and means for projecting the plungers, successively, substantially as described.

27. In a box-making machine, the combination with the mandrels, of pinions by which the mandrels are rotated, a crown-gear meshing with the pinions and connected to a suitable source of power, means whereby the said crown-gear is elevated into engagement with teeth of the pinions to hold them against movement, anvils carried by the mandrels, shook-receptacles, shook-actuating slides for delivering shooks to the anvils, a swinging arm stationed between one of the shook-receptacles and the anvils, box-ejecting plungers and means for projecting the plungers successively, substantially as described.

28. In a box-making machine, a turn-table, mandrels journaled thereon, pinions on the mandrels, a mutilated crown-gear over which the pinions travel, means for lifting the crown-gear into contact with two teeth of each pinion to prevent rotation and for rotating the turn-table on the descent of the crown-gear, shook-receptacles, shook-actuating slides for delivering shooks to the anvils, a swinging arm stationed between one of the shook-receptacles and the anvils, box-ejecting plungers and means for projecting the plungers successively, substantially as described.

29. In a box-making machine, a turn-table, mandrels journaled thereon, anvils carried by the mandrels, shook-receptacles, means for feeding shooks to the mandrels, a mutilated crown-gear over which the pinions travel, means for lifting the crown-gear into contact with two teeth of each pinion to prevent rotation, means for rotating the table in the descent of the crown-gearing, a latch-bolt for engaging the table at predetermined positions, means for projecting and retracting the bolt, shook-receptacles, shook-actuating slides for delivering shooks to the anvils, a swinging arm stationed between one of the shook-receptacles and the anvils, box-ejecting plungers and means for projecting the plungers successively, substantially as described.

In testimony whereof we have hereunto affixed our signatures in the presence of two subscribing witnesses.

JAMES H. CLARK.
ALFRED MAYER.

Witnesses:
H. B. HALLOCK,
L. W. MORRISON.